(12) United States Patent
Sahar

(10) Patent No.: US 9,971,423 B2
(45) Date of Patent: May 15, 2018

(54) STYLUS WITH INTERMITTENT VOLTAGE DRIVING AND SENSING

(71) Applicant: Microsoft Technology Licensing, LLC, Redmond, WA (US)

(72) Inventor: Ran Sahar, Natania (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 25 days.

(21) Appl. No.: 15/144,928

(22) Filed: May 3, 2016

(65) Prior Publication Data

US 2017/0322644 A1 Nov. 9, 2017

(51) Int. Cl.
*G06F 3/0354* (2013.01)

(52) U.S. Cl.
CPC ................................ *G06F 3/03545* (2013.01)

(58) Field of Classification Search
CPC .................................................. G06F 3/03545
See application file for complete search history.

(56) References Cited

U.S. PATENT DOCUMENTS

| | | | |
|---|---|---|---|
| 7,612,767 B1 | 11/2009 | Griffin et al. | |
| 8,797,301 B2 | 8/2014 | Ryshtun et al. | |
| 8,878,823 B1* | 11/2014 | Kremin ............... | G06F 3/03545 178/18.06 |
| 9,013,429 B1 | 4/2015 | Krekhovetskyy et al. | |
| 9,104,251 B1 | 8/2015 | Omelchuck et al. | |
| 2011/0169756 A1* | 7/2011 | Ogawa ................ | G06F 3/03545 345/173 |
| 2011/0243270 A1* | 10/2011 | Juan .................... | G06F 13/4072 375/295 |
| 2012/0062499 A1 | 3/2012 | Weaver et al. | |
| 2012/0262410 A1 | 10/2012 | Lim | |
| 2012/0331546 A1 | 12/2012 | Falkenburg et al. | |
| 2013/0002606 A1 | 1/2013 | Mann | |
| 2013/0106794 A1 | 5/2013 | Logan et al. | |
| 2013/0169601 A1 | 7/2013 | Mo et al. | |
| 2013/0249870 A1 | 9/2013 | Slaby et al. | |
| 2014/0002422 A1* | 1/2014 | Stern .................. | G06F 3/03545 345/179 |
| 2014/0028577 A1 | 1/2014 | Krah et al. | |
| 2014/0192030 A1 | 7/2014 | Ryshtun et al. | |
| 2016/0041635 A1* | 2/2016 | Michihata .......... | G06F 3/03545 345/179 |

OTHER PUBLICATIONS

Park et al. "A Pen-Pressure-Sensitive Capacitive Touch System Using Electrically Coupled Resonance Pen", IEEE Journal of Solid State Circuits, 51(1): 168-176, Jan. 2016.

* cited by examiner

*Primary Examiner* — Lixi C Simpson

(57) ABSTRACT

A stylus device for interacting with a computer is disclosed. The stylus device can comprise an operational circuit, an operational switch for activating and deactivating the operational circuit, and a driving and sensing circuit configured for driving a voltage supply to the operational circuit and sensing a state of the operational switch, wherein the driving and the sensing are executed intermittently on an electrical conductor.

20 Claims, 9 Drawing Sheets

STYLUS WITH INTERMITTENT VOLTAGE DRIVING AND SENSING

BACKGROUND

The use of a stylus with a touch screen interface is well established. Touch screen designs have incorporated many different technologies including resistive, capacitive, inductive, and radio frequency sensing arrays. Resistive touch screens, for example, are passive devices well suited for use with a passive stylus.

Various active stylus devices have been implemented for use with touch screens and are found in many consumer applications such as point-of-sale terminals (e.g., the signature pad used for credit card transactions in retail stores) and other public uses.

Active stylus devices can fall broadly into two categories: inductive and electrostatic. In inductive stylus devices, an AC signal is generated and is fed to the tip of the stylus, and sensors behind or around the touch screen receive the signal. The relative magnitude of the received signal at each of the sensors is used to interpolate the position of the stylus tip. In electrostatic stylus devices, an electrostatic field is generated at the tip of the stylus and is detected by a self-capacitance touchscreen.

SUMMARY

The present disclosure describes embodiments of a stylus device for interacting with a computer. The stylus device can include an operational circuit and an operational switch for activating and deactivating the operational circuit. A driving and sensing circuit optionally and preferably drives the operational circuit and senses the state of the operational switch. In some embodiments, the driving and sensing circuit provides a voltage boost to the operational circuit. The driving and the sensing are optionally and preferably executed intermittently via an electrical conductor (e.g., wire).

The stylus device can also include a writing tip and a writing tip driving circuit that drives (e.g., provides voltage boost to) the writing tip. The operational circuit provides functionality that is optionally and preferably other than writing. For example, the operational circuit can comprise an eraser circuit, in which case the provided functionality is erasing. In some embodiments, the operational switch is opposite to the writing tip.

The driving and sensing circuit optionally and preferably senses the voltage on the electrical conductor, and transmits a signal indicating the state of the operational switch in response to the sensing. In some embodiments of the present disclosure, the stylus device comprises a resistive electronic element. In these embodiments, the driving and sensing circuit can sense a voltage drop on the electrical conductor when current flows through the resistance path, and transmit a signal indicating that the operational switch is closed (i.e., the operational circuit is in its ON state) in response to the sensing. In some embodiments of the present disclosure, the stylus device comprises a capacitive electronic element forming a capacitance path from the electrical conductor to a reference point via the operational switch. In these embodiments, the driving and sensing circuit can sense the voltage drop on the electrical conductor when the capacitive electronic element is charged, and transmit a signal indicating that the operational switch is closed in response to the sensing.

The stylus device optionally and preferably comprises a controller for transmitting synchronized control signals to the driving and sensing circuit for intermittently executing the driving and sensing. When the driving includes boosting, the sensing can be executed at a peak of the boosting, after the peak of the boosting or before a peak of the boosting. The sensing can alternatively be executed during the time interval between two voltage driving cycles.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
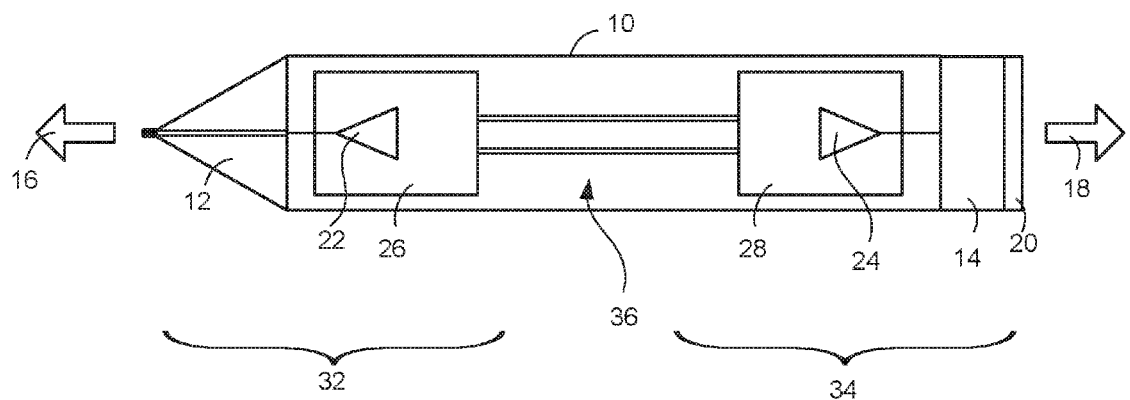
FIG. 1 is a schematic illustration of a stylus device having a digital conductor aligned lengthwise across the device.

Some embodiments of the present disclosure provide a stylus device with intermittent voltage driving (e.g., boosting) and switching.

Before explaining at least one embodiment of the exemplary embodiments in detail, it is to be understood that the disclosure is not necessarily limited in its application to the details of construction and the arrangement of the components and/or methods set forth in the following description and/or illustrated in the drawings and/or the examples. The disclosure is capable of other embodiments or of being practiced or carried out in various ways.

A conventional stylus device includes an elongated housing 10 having a head section 32 and a tail section 34, as schematically illustrated in FIG. 1. A writing tip 12 is located at the head section 32, and an eraser 14 is located at the end of the tail section 34. The operation of the stylus is controlled and synchronized by a main integrated circuit 26 that is typically located at the head section 32. Both the writing tip 12 and the eraser 14 are constituted to transmit signals (generally shown at 16 and 18, respectively) interacting with a digitizer sensor of a touch screen. Voltage boosts are provided to writing tip 12 and eraser 14 by driver circuits 22 and 24, wherein driver circuit 22 is incorporated in the main integrated circuit 26 and driver circuit 24 is incorporated in a secondary integrated circuit 28 at tail section 34.

Typically, the eraser end 14 is associated with a switch 20, such as a pressure-operated switch, that senses pressure applied on the eraser 14 when the user presses eraser 14 against the touch screen. When the switch 20 is activated (e.g., pressed), only the eraser 14 transmits its signal 18, and when the switch 20 is not activated (e.g., released), only the writing tip 12 transmits its signal 16. Since the transmission of signals 16 and 18 is responsive to the state of switch 20, there is a need to transmit signal indicative of the state of the switch from integrated circuit 28 which is located at tail section 34 to the main integrated circuit 26, which is located at head section 32. This is typically achieved by a pair of digital conductors 36 passing though housing 10 from the tail section 34 to the main circuit 26, wherein one of the digital conductors transmits information (such as, the state of the switch) from circuit 28 to the main circuit 26, and the other digital conductor transmits information (such as, control signals) from the main circuit 26 to circuit 28. However, due to the mechanical constraints of housing 10, it is difficult to route wires lengthwise through the housing.

The stylus device of the present embodiments typically comprises a circuit that drives the voltage and senses the switch state on an electrical conductor (e.g., wire). This allows integrating both voltage drivers in the same integrated circuit and reduces the number of wires that are routed lengthwise across the housing of the stylus. Thus, in some embodiments, the tail section of the stylus device is devoid of any voltage driver. Preferably, a single electrical conductor (e.g., wire) facilitates both voltage driving and switch state sensing.

Figure 2:
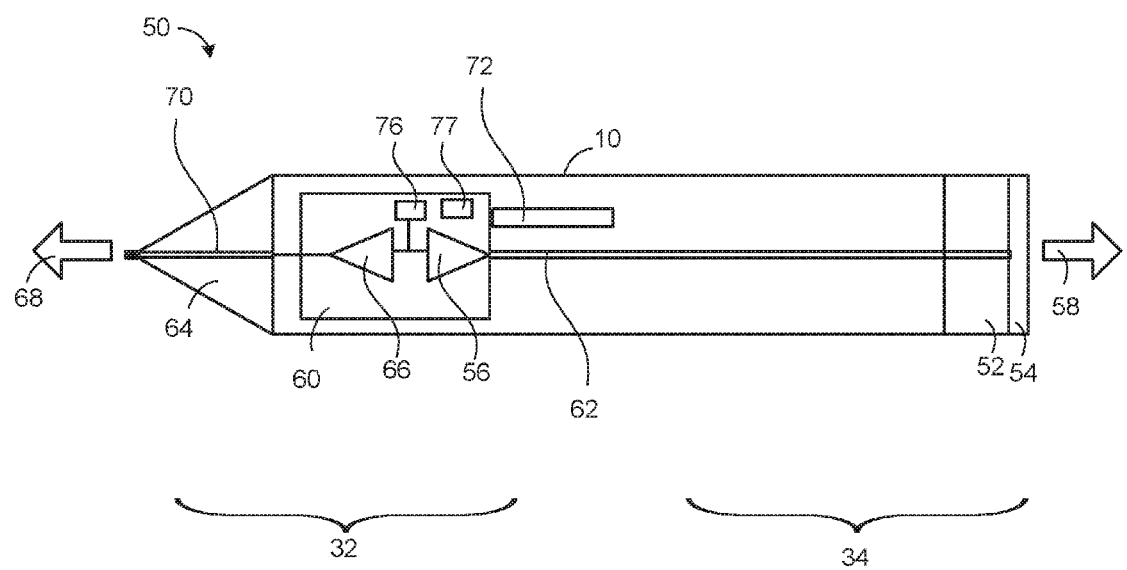
FIG. 2 is a schematic illustration of a stylus device having a voltage drive conductor aligned lengthwise across the device, according to some embodiments of the present disclosure.

FIG. 2 is a schematic illustration of a stylus device 50 for interacting with a computer, according to some embodiments of the present disclosure. Stylus device 50 can be embodied as an inductive or electrostatic stylus. Stylus device 50 optionally and preferably comprises a housing 10 with head section 32 and tail section 34 and is optionally powered by a power source 72 that is fitted into housing 10. Power source 72 can include one or more batteries and/or a super capacitor, e.g., lithium batteries and/or alkaline batteries. The battery or batteries can be rechargeable, if desired. Power source 72 typically provides voltage from about 1.5V to about 3.5V, e.g., about 1.5V or about 3.2V. Other voltage values are also contemplated. A power management solution, e.g., DC to DC converter, can also be employed to stabilize the voltage. Optionally, a regulating converter is used to obtain stable voltage over a life time of the battery, e.g., to maintain a steady performance.

Housing 10 encapsulates an operational circuit 52 and an operational switch 54 for activating and deactivating operational circuit 52. Operational circuit 52 is preferably configured for transmitting a signal 58 that interacts with a digitizer sensor of a touch screen. Operational circuit 52, provides, via signal 58, functionality that is other than writing. Representative examples of functionalities that can be provided by means of signal 58 include, without limitation, erasing, marking, drawing wide lines, drawing with selected colors, drawing with selected line patterns and the like. In various exemplary embodiments of the disclosure the operational circuit is an eraser circuit, in which case the functionality provided by means of signal 58 is erasing.

Device 50 optionally and preferably comprises a driving and sensing circuit 56 that is configured for driving a voltage supply to operational circuit 52 and sensing a state of operational switch 54.

Driving and sensing circuit 56 optionally and preferably capable of generating both inflow and outflow of electrical current from operational circuit 52. In some embodiments, driving and sensing circuit 56 is configured for boosting the voltage supply to operational circuit 52.

As used herein "voltage boost cycle" refers to a cycle in which the voltage is increased to reach a predetermined level, and is then decreased to restore its initial level. The period of time during which the voltage is increased is referred to as "the buildup period of the voltage boost cycle", and the period of time during which the voltage is decreased is referred to as "the fall-off period of the voltage boost cycle".

While the embodiments below are described with a particular emphasis to voltage boost, it is to be understood that more detailed reference to voltage boost is not to be interpreted as limiting the scope of the disclosure to this type of voltage drive, and that any voltage driver that is capable of generating both inflow and outflow of electrical current can be employed.

Optionally and preferably, sensing circuit 56 is integrated in a main integrated circuit 60 of stylus device 50, which can be, for example, an application-specific integrated circuit (ASIC). Integrated circuit 60 can be placed at the head section 32 of housing 10. A voltage driving electrical conductor (e.g., wire) 62 provides communication between operational circuit 52, operational switch 54, and driving and sensing circuit 56. According to some embodiments of the disclosure, driving and sensing circuit 56 executes both the driving (e.g., boosting) and the sensing on the conductor (e.g., wire) 62. Typically, the driving (e.g., boosting) and the sensing are executed intermittently according to a predetermined protocol. In some embodiments of the present disclosure, driving and sensing circuit 56 senses a voltage on the electrical conductor 62, and transmits, to the main integrated circuit 60, directly or via a dedicated CPU (not shown), a signal indicating the state of operational switch 54 in response to the sensed voltage. Representative synchronization protocols and voltage sensing techniques are provided in greater detail hereinbelow.

In various exemplary embodiments of the present disclosure, device 50 comprises a writing tip 64 having an elongated transmitter 70, and a writing tip driving circuit 66 that drives (e.g., boosts) a voltage supply to writing tip 64. Optionally, the operational switch 54 is opposite to the writing tip 64. For example, the writing tip 64 can be at the head section 32 and the operational switch 54 can be at the tail section 34, as illustrated in FIG. 2. Writing tip 64 is preferably configured for transmitting a signal 68 that interacts with the digitizer sensor of the touch screen.

Optionally, the signal 58 transmitted by the operational circuit 52 is different from the signal transmitted by the writing tip 64 so that the digitizer of the touch screen can distinguish between input received from stylus device 10 when circuit 52 operates and input received from stylus device 10 when the writing tip 64 is operates. The difference can be a modification in phase, frequency, amplitude and/or pulse repetition rate. Optionally, at least one of amplitude shift keying (ASK), phase shift keying (PSK) and frequency shift keying (FSK) is used to modify the transmitted signal.

The functionality provided by operational circuit 52, by means of signal 58, is typically used less often and/or for shorter periods of time as compared to the functionality provided by the writing tip 64, by means of signal 68. Additionally, the accuracy required for the functionality provided by operational circuit 52 is optionally and preferably lower than that required for writing and that is provided by writing tip 64. Thus, in some embodiments of the present disclosure the amplitude of signal 58 is lower than the amplitude of signal 68. These embodiments are advantageous from the standpoint of battery life lengthening, since the power consumption is reduced when the amplitude of the signal is reduced. Typically, but not necessarily, the amplitude of signal 58 is between 2-20 times less than that of signal 68. To maintain an adequate signal-to-noise ratio (SNR) on the digitizer, the antenna of operational circuit 52 is preferably thicker than the antenna of writing tip 64. For example, the diameter and/or at least one dimension of the antenna or other transmitting portion of operational circuit 52 can be about 2-10 times larger than the diameter of the antenna or other transmitting portion of writing tip 64.

Following is a description of representative examples of synchronization protocols and voltage sensing techniques suitable for the present embodiments.

Figure 3A:
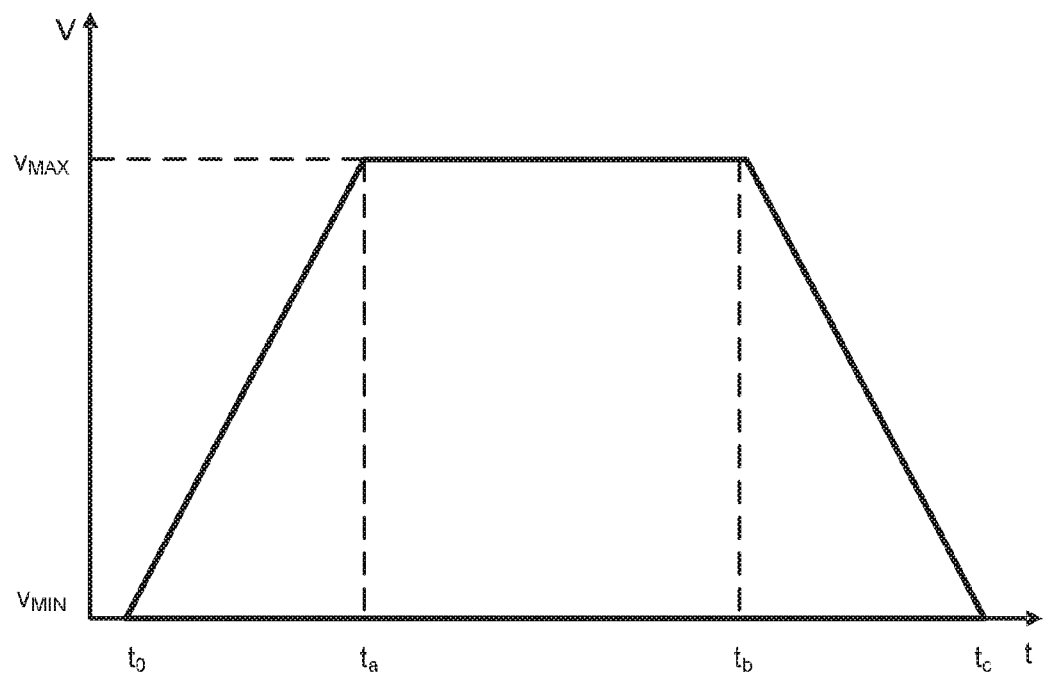
FIGS. 3A and 3B are schematic illustrations of voltage on an electrical conductor as a function of the time when an operational switch is not pressed.

FIG. 3A is a schematic illustration of the voltage on electrical conductor 62 as a function of time, during a voltage boost cycle executed by circuit 56, when operational switch is not pressed.

As used herein "voltage on an electrical conductor" refers to the difference between the electrical potential along the electrical conductor (which is practically approximately the same along the electrical conductor) and the electrical potential at a reference point (for example, the ground point).

The voltage on electrical conductor 62 when operational switch is not pressed is referred to herein as "uninterrupted" voltage.

With reference to FIG. 3A, the exemplified uninterrupted voltage shows a buildup period from time $t_0$ to time $t_a$ and a fall-off period from time $t_b$ to time $t_c$, where $t_0<t_a<t_b<t_c$. At times $t_0$ and $t_c$ the voltage on conductor 62 is at its minimum level $v_{MIN}$ (typically zero), and during the period from time $t_a$ to time $t_b$ the voltage on conductor 62 is generally constant at its peak (maximum) level $v_{MAX}$. A typical value for $v_{MIN}$ is 0 volts and a typical value for $v_{MAX}$ is from about 10 volts to about 30 volts or from about 15 volts to about 25 volts. A circuit suitable for providing a voltage boost cycle such as the cycle shown in FIG. 3A is provided hereinunder.

Circuit 56 optionally and preferably ceases the voltage drive (e.g., boost) for a sufficiently short sensing time period $\Delta t_{sense}$ during the voltage drive (e.g., boost) cycle. During this period, circuit 56 senses the voltage on conductor 62 and compares the sensed voltage to the uninterrupted voltage (namely that voltage that would have been exhibited on conductor 62, at the same time, had the operational switch 54 would not have been pressed). When the sensed voltage is the same as the uninterrupted voltage, circuit 56 transmits to the main circuit 60 a signal indicative that switch 54 is in its opened state. When the sensed voltage is different than the uninterrupted voltage (typically lower than the uninterrupted voltage, as further detailed hereinbelow) circuit 56 transmits to the main circuit 60 a signal indicative that switch 54 is in its closed state.

The typical duration of the sensing time period $\Delta t_{sense}$ is from about 20 μs to about 200 μs, or from about 50 μs to about 150 μs, or from about 75 μs to about 125 μs. The sensing time-period can be during the buildup period of the voltage boost cycle (between times $t_0$ and $t_a$, in FIG. 3A), during the fall-off period of the voltage boost cycle (between times $t_b$ and $t_c$, in FIG. 3A), or when the uninterrupted voltage on conductor 62 is expected to reach its maximum (between times $t_a$ and $t_b$, in FIG. 3A). Sensing when the uninterrupted voltage on conductor 62 is expected to reach its peak level is preferred from the standpoint of dynamic range, because the voltage is high. When the sensing is during the buildup or fall-off periods of the cycle, it is optionally and preferably during a time period at which the uninterrupted voltage on conductor 62 is expected to reach at least 5% or at least 10% or at least 20% of its peak value.

Figure 3B:
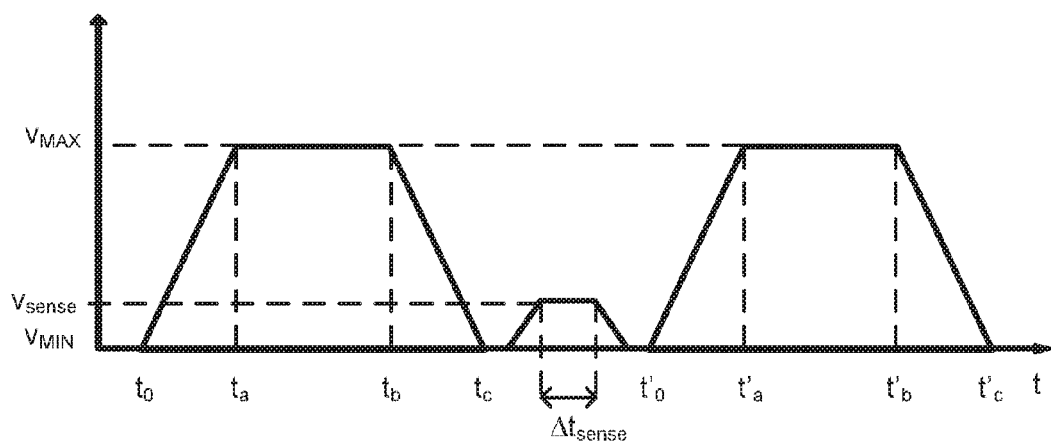

Also contemplated, are embodiments in which circuit 56 does not cease the voltage drive (e.g., boost) for sensing. In these embodiments, circuit 56 generates a dedicated voltage peak during the time interval between two successive voltage drive (e.g., boost) cycles, and the sensing time period $\Delta t_{sense}$ is during the buildup, fall-off or, more preferably, the peak of this dedicated voltage peak. A representative example of these embodiments is illustrated in FIG. 3B, showing a dedicated peak at voltage $v_{sense}$ between two successive voltage boost cycles (shown at reduced scale relative to FIG. 3A), wherein the sensing time period $\Delta t_{sense}$ is during the peak $v_{sense}$. The value of $v_{sense}$ is typically about 20% of $v_{MAX}$.

In embodiments in which a dedicated voltage peak is generated, the voltage of the peak is preferably provided by a regulating amplifier generally shown at 77. This is particularly useful when $v_{sense}$ is small (e.g., about 20% of $v_{MAX}$) since regulating amplifier 77 can provide more accurate voltage level, compared to power source 72.

The timings of the voltage drive (e.g., boost) cycles, sensing time period, and dedicated peaks (if employed), as well as other synchronized operations performed by stylus device 10 (e.g., providing of voltage boost cycles to writing tip 64, emissions of signals 58 and 68), are preferably controlled by a controller 76 that is typically integrated in the main integrated circuit 60 of stylus device 10. Typically, controller 76 includes an oscillator, e.g., a multi-vibrator or crystal interface, generating a signal with frequency from about 2 KHz to about 2 MHz. Typically, controller 76 provides control signals that instruct circuits 56 and 66 to execute a voltage boot cycle every 0.1-10 μs.

Figure 4A:
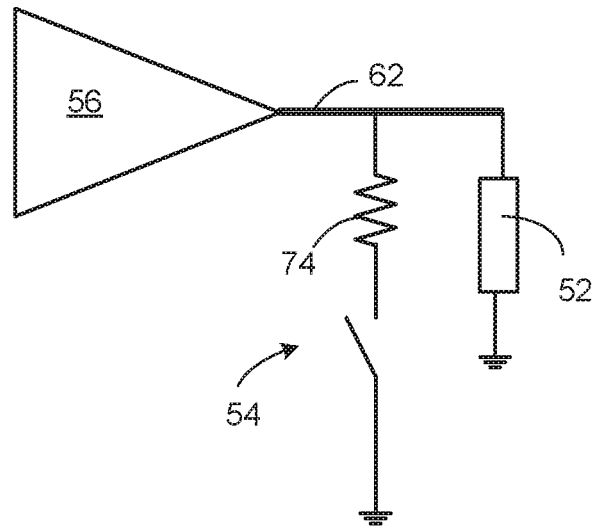
FIGS. 4A and 4B are schematic illustrations of circuit components that can be used for sensing voltage on an electrical conductor according to some embodiments of the present disclosure.
Figure 4B:
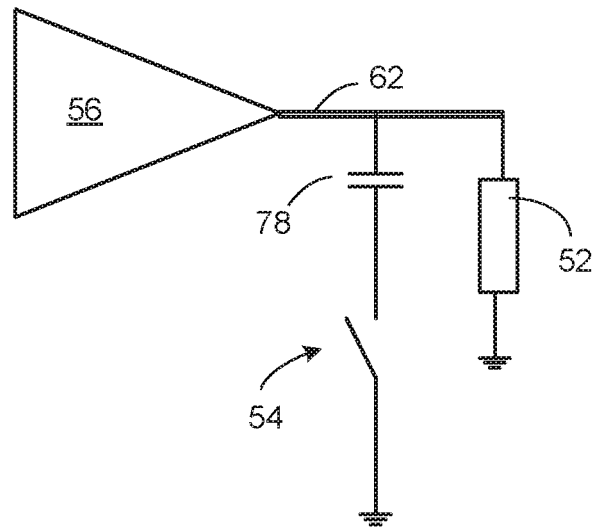

FIGS. 4A and 4B are schematic illustrations of circuit components that can be used for sensing the voltage on conductor 62 during the sensing time period according to some embodiments of the present disclosure.

In the embodiment illustrated in FIG. 4A, a resistive electronic element 74 is connected to form a resistance path from the electrical conductor 62 to a reference point (e.g., ground) via the operational switch 54. Circuit 52 is optionally and preferably also connected between conductor 62 and the same reference point, so that when switch 54 is close, there is a parallel electrical connection between element 74 and circuit 52. Typically, the resistance of element 74 is selected such that the current flowing through element 74 when switch 54 is close is from about 10 nA to 10 μm. For example, when power source 72 provides voltage of less than 5 volts (e.g., 2 volts of 1.5 volts), the resistance of element 74 is from about 1 MΩ to about 100 MΩ.

In accordance with the timing protocol set by controller 76, circuit 56 drives the voltage (e.g., provides voltage boosts) to circuit 52 and intermittently senses the voltage on conductor 62.

When the switch 54 is open, there is no resistance path via element 74 to the reference point, so that the voltage on conductor 62 is uninterrupted. Thus, in this case, circuit 56, during the sensing time-period, transmits to circuit 60 a signal indicative that the switch 54 is opened, since the voltage on conductor 62 is the same as the expected uninterrupted voltage.

Figure 5A:
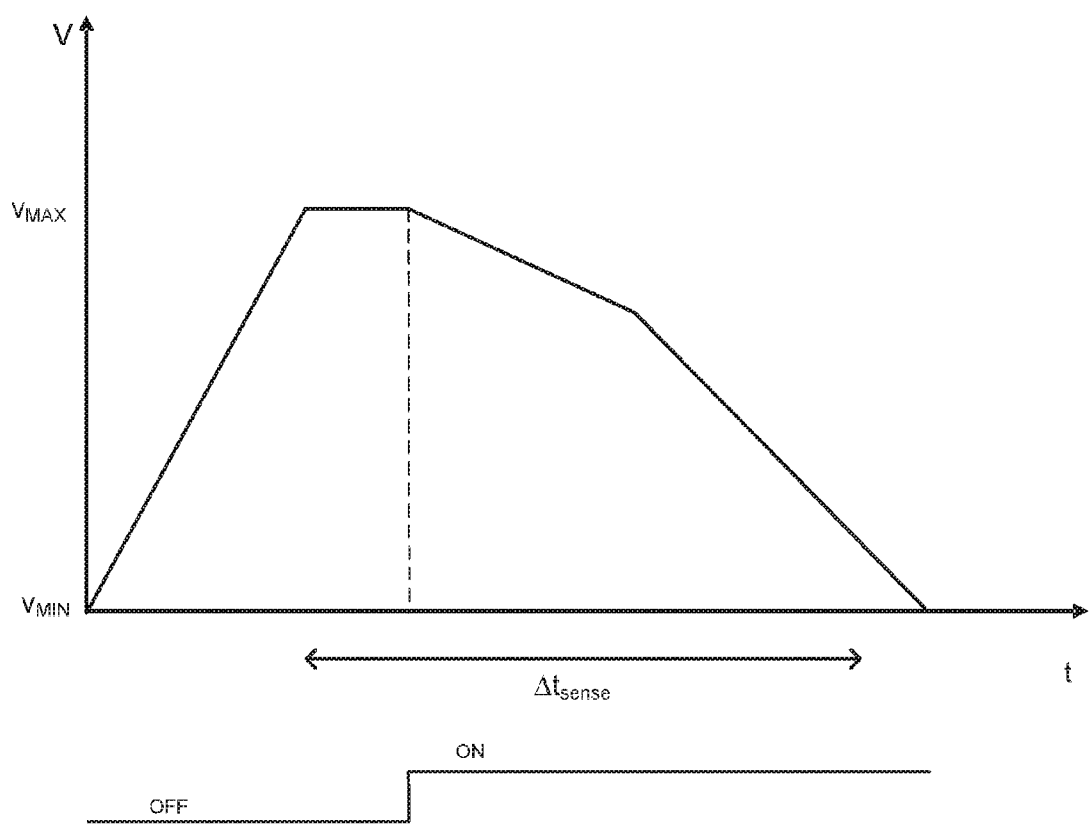
FIGS. 5A and 5B are a schematic illustration of voltage on an electrical conductor as a function of the time, during a voltage boost cycle executed when an operational switch is pressed.
Figure 5B:
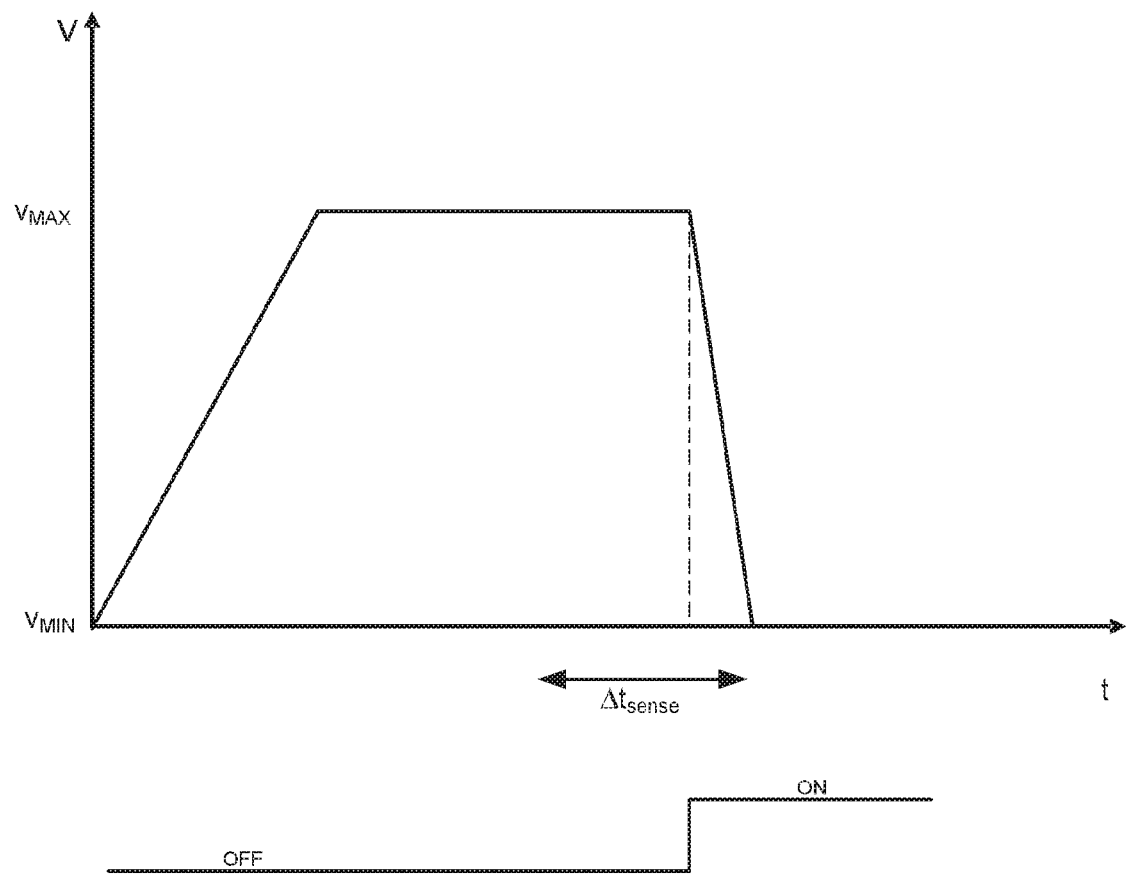

When the switch 54 is closed, there is a resistance path via element 74 to the reference point, so that current flows through the resistance path, thereby decreasing the voltage on conductor 62. Thus, in this case, circuit 56, during the sensing time-period, transmits to circuit 60 a signal indicative that the switch 54 is closed, since the voltage on conductor 62 differs from the uninterrupted voltage. Representative examples of this scenario, in embodiments in which the sensing time period is at the peak or during the fall-off period (after the peak) of the voltage boost cycle are illustrated in FIGS. 5A and 5B. Also shown in FIGS. 5A and 5B is the state of the switch, wherein "ON" designates closed state of the switch and "OFF" designates open state of the switch.

In FIG. 4B, a capacitive electronic element 78 is connected to form a capacitance path from the electrical conductor 62 to a reference point (e.g., ground) via the operational switch 54. Circuit 52 is optionally and preferably also connected between conductor 62 and the same reference point, so that when switch 54 is close, there is a parallel electrical connection between element 78 and circuit 52. Typically, the capacitance of element 76 is from about 1 pF to about 100 pF, or from about 1 pF to about 90 pF, or from about 1 pF to about 80 pF, or from about 1 pF to about 70 pF, or from about 1 pF to about 60 pF, or from about 1 pF to about 50 pF, or from about 1 pF to about 40 pF, or from about 10 pF to about 40 pF.

In accordance with the timing protocol set by controller 76, circuit 56 drives the voltage (e.g., provides voltage boosts) to circuit 52 and intermittently senses the voltage on conductor 62. When the switch 54 is open, there is no capacitance path via element 74 to the reference point, so that the voltage on conductor 62 is uninterrupted. Thus, in this case, circuit 56, during the sensing time-period, transmits to circuit 60 a signal indicative that the switch 54 is opened, since the voltage on conductor 62 is the same as the expected uninterrupted voltage. When the switch 54 is closed, there is a capacitance path via element 76 to the reference point, so that element 78 is charged, thereby decreasing, typically stepwise, thereby decreasing the voltage on element 78 due to the charge sharing between element 78 and circuit 52. Thus, in this case, circuit 56, during the sensing time-period, transmits to circuit 60 a signal indicative that the switch 54 is closed, since the voltage on conductor 62 differs from the uninterrupted voltage.

As used herein, "capacitive electronic element" or "capacitor" refers to any electronic component or electronic circuitry that is capable of storing electrical charge in response to a voltage applied to the electronic component, and which generally does not allow flow of direct current through the electronic component as a result of this applied voltage.

As a representative example, which is not to be considered as limiting, a field effect transistor (FET) can serve as a capacitor by connecting its drain, source and bulk terminals, and biasing its gate terminal. Also contemplated is the use of N-well or P-well structures. Specifically, a capacitor according to some embodiments of the present disclosure can be a transistor built within an N-well or within a P-well. The advantage of these embodiments is that they allow biasing the transistor at a voltage that is higher than the characteristic bias voltage of the transistor when not built within an N-well or within a P-well. Such configuration provides an efficient capacitor with low area and relatively high voltage biasing (for example, about 2 volts higher). Preferably, the capacitor is connected to circuit 60 via conductor 62.

As will be appreciated by one having an ordinary skill in the art of electronic circuits, a transistor in which the drain and the source terminals are not maintained at the same electrical potential, cannot function, by itself, as a capacitor. For example, some circuit elements include a transistor in which the gate terminal is connected to the source or drain terminal while the other terminal (drain or source) is at a different potential than the gate. Such circuit elements can function as a diode, but are generally incapable of storing charge. Thus, in various exemplary embodiments of the disclosure the term "capacitor" excludes transistors in which the drain and the source terminals are not maintained at the same electrical potential.

Following is a description of a driver circuit that can be used according to some embodiments of the present disclosure for voltage boosting, and that can be employed by circuit 66 for providing a voltage boost to the writing tip 64 and/or by circuit 56 for providing a voltage boost to the operational circuit 52.

Figure 6:
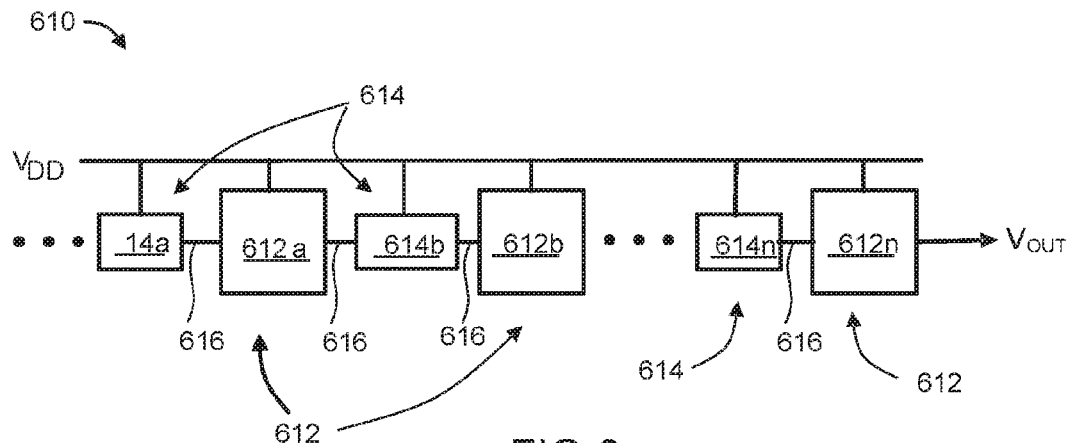
FIG. 6 is a block diagram illustrating a driver circuit for voltage boosting, according to some embodiments of the present disclosure.

Referring now to the drawings, FIG. 6 is a block diagram illustrating a driver circuit 610 for voltage boosting, according to some embodiments of the present disclosure. Driver circuit 610 comprises a plurality of circuit cells 612, and a plurality of inter-cell switching circuits 614. Driver circuit 610 can comprise any number of cells, provided there is a plurality of cells. Thus, driver circuit 610 can comprise 2 or more cells. Typically, but not necessarily, there are at least 15 cells in driver circuit 610. The last circuit cell in the series is denoted 612n, and the last inter-cell switching circuit is denoted 614n.

Circuit cells 612 are configured to amplify voltage, wherein the ith cell amplifies the intermediate output voltage of the i−1 cell. Inter-cell switching circuits 614 are arranged to controllably concatenate cells 612 in series such that, for any pair of adjacent cells (e.g., cells 612a and 612b, in FIG. 6), voltage amplified by cell 612a is applied, via a respective inter-cell switching circuit (e.g., inter-cell switching circuit 614b, in FIG. 6) to cell 612b. Conductors by which voltage is applied by one cell to the other are shown at 616.

Figure 7A:
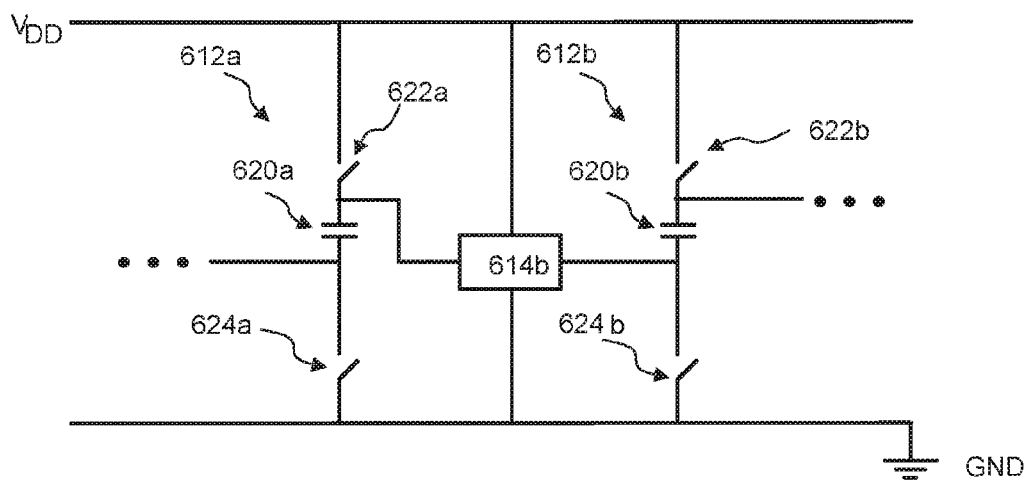
FIG. 7A is a simplified schematic illustration of two cells and of the driver circuit, according to some embodiments of the present disclosure.

In various exemplary embodiments of the disclosure each cell also receives supply voltage $V_{DD}$. $V_{DD}$ is typically used for electrically charging cells 612 thereby allowing them to amplify the voltage. This can be better understood with reference to FIG. 7A which is a simplified schematic illustration of two cells 612a and 612b of driver circuit 610, according to some embodiments of the present disclosure.

Each of cells 612a and 612b is schematically illustrated as comprising a capacitor, where the capacitor of cell 612a is designated 620a and the capacitor of cell 612b is designated 620b.

In some embodiments of the present disclosure, each of cells 612a and 612b comprises controllable intra-cell switches that allow applying voltage to capacitors 620a and 620b.

As used herein, "electronic switch" refers to any electronic element or electronic circuitry that has a binary switching functionality. A representative example of such electronic element is a transistor, when operated digitally.

Two intra-cell electronic switches are shown in each of cells 612a and 612b. A first electronic switch 622a, 622b connects and disconnects one terminal of the capacitor 620a, 620b to supply voltage $V_{DD}$, and a second electronic switch 624a, 624b connects and disconnects the other terminal of the capacitor 620a, 620b to a reference point (e.g., ground GND, in FIG. 7A).

Figure 7B:
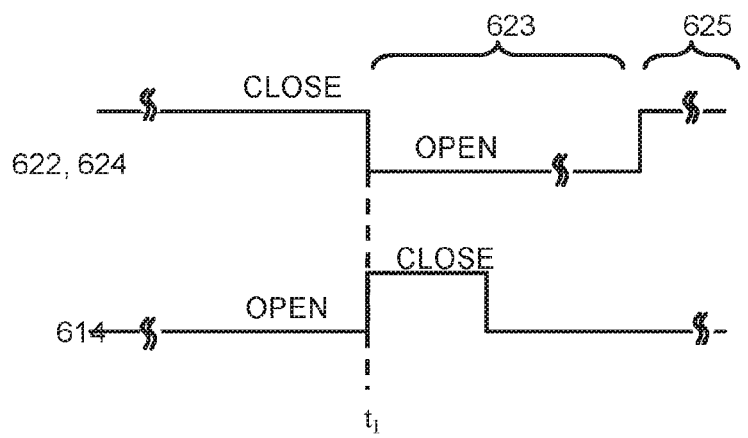
FIGS. 7B and 7C are schematic illustrations of control signals that can be transmitted to cells and inter-cell switching circuits according to some embodiments of the present disclosure.

A schematic illustration of control signals that can be transmitted according to some embodiments of the present disclosure in a buildup period of a single voltage boost cycle to electronic switches 622, 624 as well as to inter-cell switching circuit 614 is provided in FIG. 7B.

At time $t<t_1$ within the voltage boost cycle shown in FIG. 7B, both electronic switches 622 and 624 are in a closed state while inter-cell switching circuit 614 is in an open state (namely capacitors 620a and 620b of cells 612a and 612b are disconnected from each other). This charges capacitors 620 by electrical charge that is proportional to the potential difference between the $V_{DD}$ terminal and the reference point. For example, when this potential difference equals $V_{DD}$, each of the capacitors 620 stores electrical charge of $C \cdot V_{DD}$, where C is the characteristic capacitance of the respective capacitor.

Typically, but not necessarily, $V_{DD}$ is from about 1 volt to about 5 volts or from about 1.5 volts to about 4 volts or from about 1.5 volt to about 3 volts or from about 1.5 volts to about 2.5 volts or from about 1.7 volts to about 2.3 volts (e.g., about 2 volts), and C is from about 80 pF to about 300 pF or from about 80 pF to about 200 pF or from about 100 pF to about 200 pF (e.g., about 120 pF), but other values are also contemplated in any of the disclosed embodiments.

At time $t>t_1$ within the buildup period 623 of the voltage boost cycle shown in FIG. 7B, both electronic switches 622 and 624 are in an open state (namely the capacitors 620 are disconnected from the terminals of the supply line $V_{DD}$ and from the reference points), while inter-cell switching circuit 614 is brought to a closed state. In this electrical configuration, capacitors 620 are essentially connected in series to each other, thereby achieving a voltage boost, since the effective capacitance is reduced. The output voltage $V_{OUT}$ of driver circuit 610 (the output of the last cell 612n, see FIG. 6) is therefor higher than $V_{DD}$, and the degree of amplification increases as the number of amplification cells 614 increases. For small or no external load, $V_{OUT}$ can be approximately $N \times V_{DD}$, where N is the number of cells 612 in driver circuit 610. For higher external load (e.g., of about 10 pF), $V_{OUT}$ can be approximately $0.66 \, N \times V_{DD}$. During the fall-off period 625 of the voltage boost cycle shown in FIG. 7B, both electronic switches 622 and 624 are brought to their close state, thereby allowing the voltage to restore its original level.

Figure 7C:
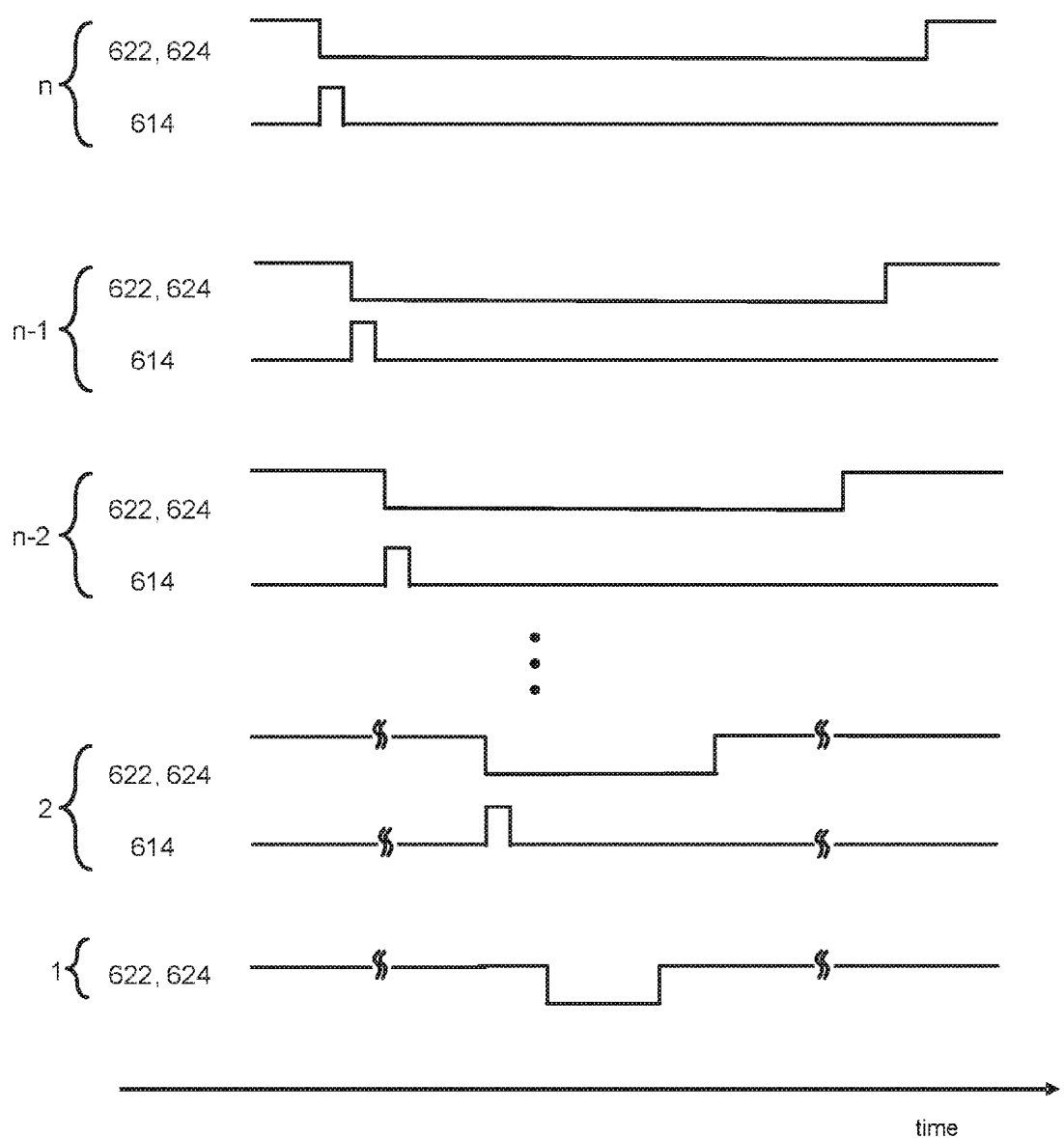

The control signals that are schematically described in FIG. 7B define buildup 623 and fall-off 625 periods per one cell. In various exemplary embodiments of the disclosure all the cells and inter-cell switching circuits of driver circuit 610 receive control signals as schematically described in FIG. 7B except that there is an overall time shift among different cells. Typically, electronic switches 622 and 624 are opened for cell i after the inter-cell switching circuit 614 of cell i+1 is reopened within the voltage boost cycle, where cell i+1 amplifies the voltage of cell i. Thus, control signals are firstly transmitted to operate cell 612n and inter-cell switching circuit 614n, secondly to operate cell 612$_{n-1}$ and inter-cell switching circuit 614$_{n-1}$, and so on. A set of control signals suitable for the entire driver circuit according to some embodiments of the present disclosure is illustrated in FIG. 7C. The cycles of control signals are labeled "n", "n−1", "n−2", ..., "2" and "1" in correspondence with the cell and inter-cell switching circuit numbers that receive the control signals of the respective cycle. Note that since there is no inter-cell switching circuit before the first cell of the series, the cycle "1" does not have control signals to inter-cell switching circuit 614.

The above procedure is preferably repeated at a frequency selected according to the appliance system that is operated by the output voltage $V_{OUT}$. Typically, but not necessarily, the procedure is repeated at a frequency of from about 1 kHz to about 10 MHz, or from about 10 kHz to about 10 MHz, or from about 50 kHz to about 10 MHz, or from about 50 kHz to about 5 MHz. Such frequencies are useful, for example, when $V_{OUT}$ is utilized for operating an electrostatic pen of a touch screen.

To obtain a configuration that reduces the power consumed by repeatedly activating and deactivating the inter-cell switching circuits 614, it may be advantageous to allow self-biasing of these switching circuits. The use of self-biased switching circuits may significantly reduce the number of toggling operations that are required for achieving voltage boosting. In a driver circuit with self-biased switching circuits, according to some embodiments of the present disclosure, a single toggling is required, irrespective of the number of the cells in the driver circuit. This is unlike conventional driver circuits in which the number of toggling operations per single voltage step grows linearly with the number of amplification stages. Such a reduction in the required number of toggling operations may significantly reduce the power consumption of the driver circuit.

One way to provide switching circuit 614 with a self-biasing property is to connect a capacitor and a transistor in parallel, as will now be explained with reference to FIGS. 8A and 8B. Use of a capacitor in parallel to a transistor as described below is contemplated for any of the embodiments described herein.

Figure 8A:
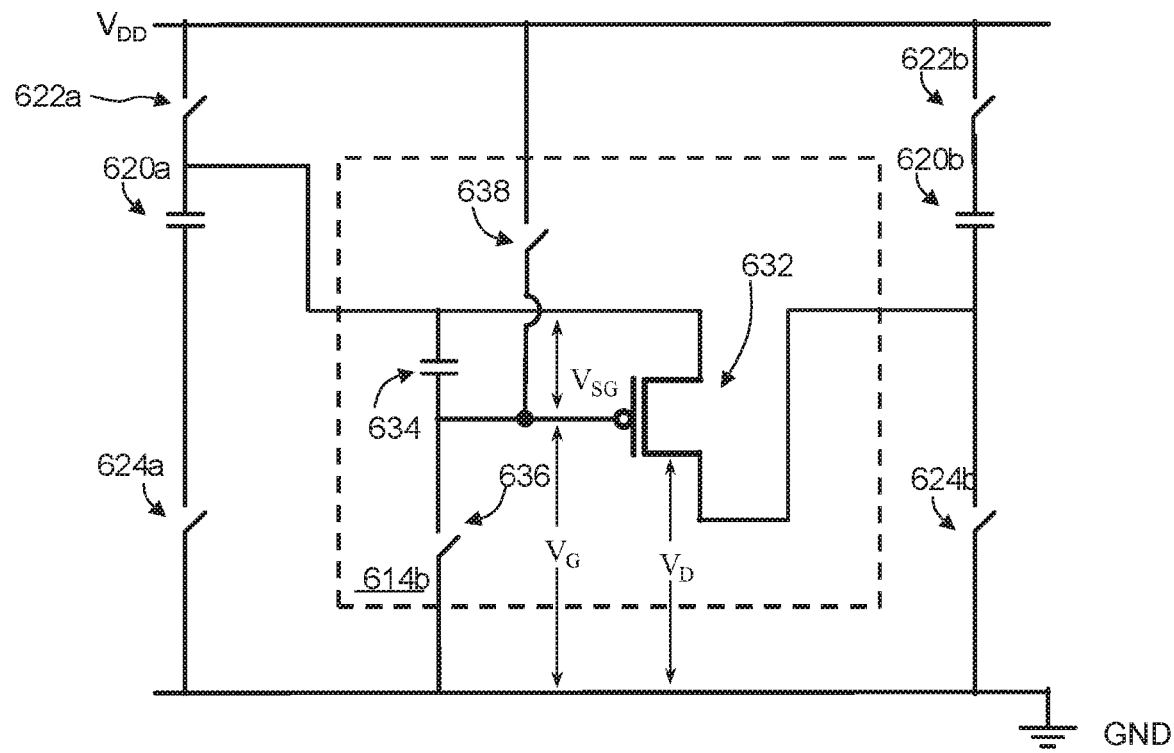
FIG. 8A is a schematic illustration showing an inter-cell switching circuit in greater detail, according to some embodiments of the present disclosure.

FIG. 8A is a schematic illustration showing inter-cell switching circuit 614b in detail, according to some embodiments of the present disclosure. The other inter-cell switching circuits 614 of driver are typically similar in their components. In the following description, the reference sign "a" is omitted from the components of the circuit 614, for clarity of presentation.

Inter-cell switching circuit 614 can comprise a transistor 632 and a capacitor 634 electrically connected in parallel to each other such that the source-gate voltage $V_{SG}$ of transistor 632 equals the voltage drop on capacitor 634 at all times.

The gate voltage of transistor 632 is denoted $V_G$ and drain voltage of transistor 632 is denoted $V_D$. In the representative illustration, which is not to be considered as limiting, transistor 632 is symbolized as a pFET, but this need not necessarily be the case, since, for some applications, it may not be necessary for transistor 632 to be a pFET. Other types of transistors, for example, nFET can also be employed. Preferably, but not obligatorily, transistor 632 is of the MOSFET type.

Capacitor 634 can be embodied as an electronic component or electronic circuitry, such as, but not limited to, a transistor, and may optionally be provided within a p-well or n-well structure as further detailed hereinabove. Typically, the capacitance of capacitor 634 is from about 1 pF to about 10 pF, or from about 1 pF to about 5 pF, or from about 1 pF to about 4 pF, or from about 1 pF to about 3 pF, or from about 1 pF to about 2 pF, e.g., about 1.6 pF.

Inter-cell switching circuit 614 can also comprise one or more electronic switches. For example, an arrangement of electronic switches can connect the source and gate terminals of transistor 632 to a reference line (e.g., the ground point GND) and a supply line (e.g., $V_{DD}$), respectively. Two such electronic switches 636 and 638 are illustrated in FIG. 8A. Each electronic switch the arrangement (e.g., each of electronic switches 636 and 638) can be any electronic element or electronic circuitry that has a binary switching functionality, such as, but not limited to, a digitally operated transistor. Electronic switches 636 and 638 are optionally and preferably connected so as to controllably charge and discharge the capacitor 634. In the illustrated embodiment, which is not to be considered as limiting, electronic switch 638 controls the electrical communication of the gate of transistor 632 to a terminal of the $V_{DD}$ line and electronic switch 636 controls the electrical communication of the gate of transistor 632 with a terminal of the reference line (the ground point GND, in the present example).

In various exemplary embodiments of the disclosure, the activations of electronic switches 636 and 638 are synchronized with the activations of electronic switches 622 and 624, so that when electronic switch 638 is in its closed state and electronic switch 636 is in its open state, capacitor 634 is discharged, and when electronic switch 638 is in its open state and electronic switch 636 is in its closed state capacitor 634 is charged. This will now be explained in greater detail.

When electronic switches 622 and 624 are in their closed state (namely when the voltage at 622 is $V_{DD}$), electronic switch 638 is in its closed state and electronic switch 636 is in its open state. This discharges capacitor 634 since both its terminals are at the same electrical potential (e.g., $V_{DD}$). At this state, transistor 632 is not biased (OFF state) because its source-gate voltage $V_{SG}$ equals zero.

When electronic switches 622 and 624 are brought to their open state, electronic switch 638 is opened and optionally and preferably remains open, while electronic switch 636 is closed for a relatively short period of time Δt. Typically, but not necessarily, Δt is from a few (e.g., about 5) nanoseconds to a few hundreds of nanoseconds or from a few nanoseconds to 100 ns, or from about 10 ns to several tens of nanoseconds, e.g., for about 30 ns. During time-period Δt, the voltage drop on capacitor 634 approximately equals the voltage on the capacitor of the circuit cell that is at the input side of inter-cell switching circuit 614 (capacitor 620a, in the present example). Since at the time when electronic switches 622 and 624 are opened, capacitors 620 are still electrically charged, the momentary closing of electronic switch 636 charges capacitor 634. Typically, capacitor 634 is charged to a voltage of about $V_{DD}$, because capacitors 620 are also charged to $V_{DD}$, resulting in a source-gate voltage VSG of −VDD on transistor 632. This biases the transistor 632 (ON state) and therefore opens electrical communication between the cells at both sides of circuit 614 (cells 612a and 612b in the present example).

In various exemplary embodiments of the disclosure electronic switch 636 is closed (optionally and preferably for a relatively short period of time Δt, as stated) only once during a single voltage boost cycle. This facilitates self-biasing in circuit 614 since when capacitor 634 is charged and electronic switch 636 is in its open state, $V_{GS}$ traces the changes of its source terminal, thus keeping transistor 632 at its ON state. Such tracing is advantageous because it does not require additional power for biasing transistor 632. The voltage drop on the capacitors 634, hence also the bias on the transistors 632, varies automatically, without transmitting additional control signals to electronic switches 636 and 638 during the cycle. The variation in voltage drop is exhibited both as a function of the location of the inter-cell switching circuit along the series of driver circuit 610), and as a function of the time (during the buildup and fall-off of $V_{OUT}$ at the beginning and end of the voltage boost cycle, respectively). A schematic illustration of control signals that can be transmitted in a buildup period of a single voltage boost cycle to intra-cell electronic switches 622, 624 as well as to electronic switches 636 and 638 of inter-cell switching circuit 614 according to some embodiments of the present disclosure is provided in FIG. 8B.

At time t<$t_1$ within the voltage boost cycle, electronic switches 622, 624 and 638 are in a closed state while electronic switches 636 are in an open state. This charges capacitors 620 by electrical charge that is proportional to the potential difference between the $V_{DD}$ terminal and the reference point. This also discharges capacitors 634, and brings transistors 632 to their OFF state because at this configuration there is no voltage drop on capacitors 634. At time t>$t_1$ within the buildup period 623 of the voltage boost cycle, electronic switches 622, 624 and 638 are in an open state and remain open until the end of buildup period 623 of the voltage boost cycle. Electronic switches 636 are brought to their closed state at time $t_1$, opened at time $t_2=t_1+\Delta t$, and remains open until the end of the voltage boost cycle. During the time-period Δt, capacitors 634 are charged, and transistors 632 are biased to their ON state, while for any time t>$t_2$, until the end of the voltage boost cycle, self-biasing is exhibited, as further detailed hereinabove. During the fall-off period 625 of the voltage boost cycle shown in FIG. 8B, electronic switches 622, 624 and 638 are brought to their close state, thereby allowing the voltage to restore its original level.

Figure 8B:
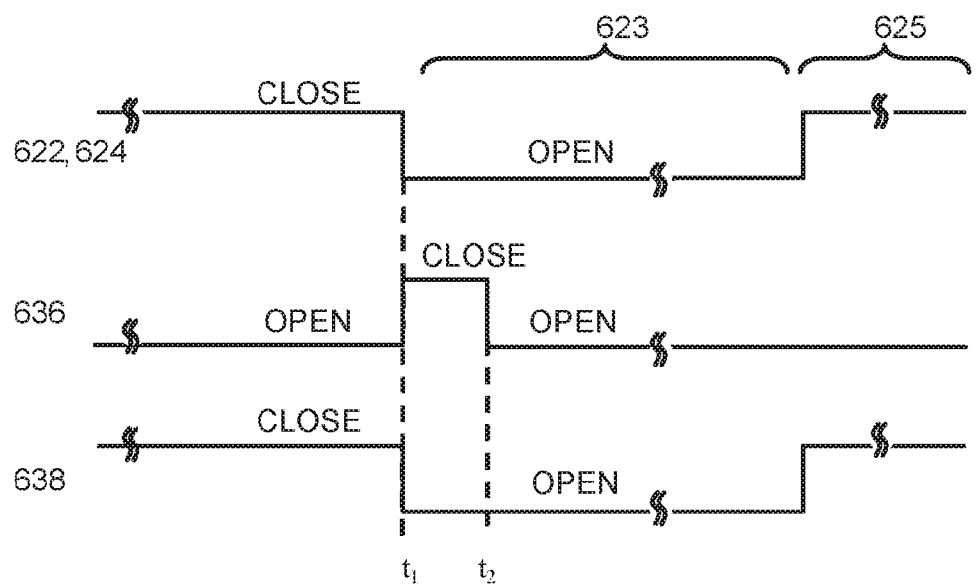
FIGS. 8B and 8C are schematic illustrations of control signals that can be transmitted to cells and switches within inter-cell switching circuits according to some embodiments of the present disclosure.
Figure 8C:
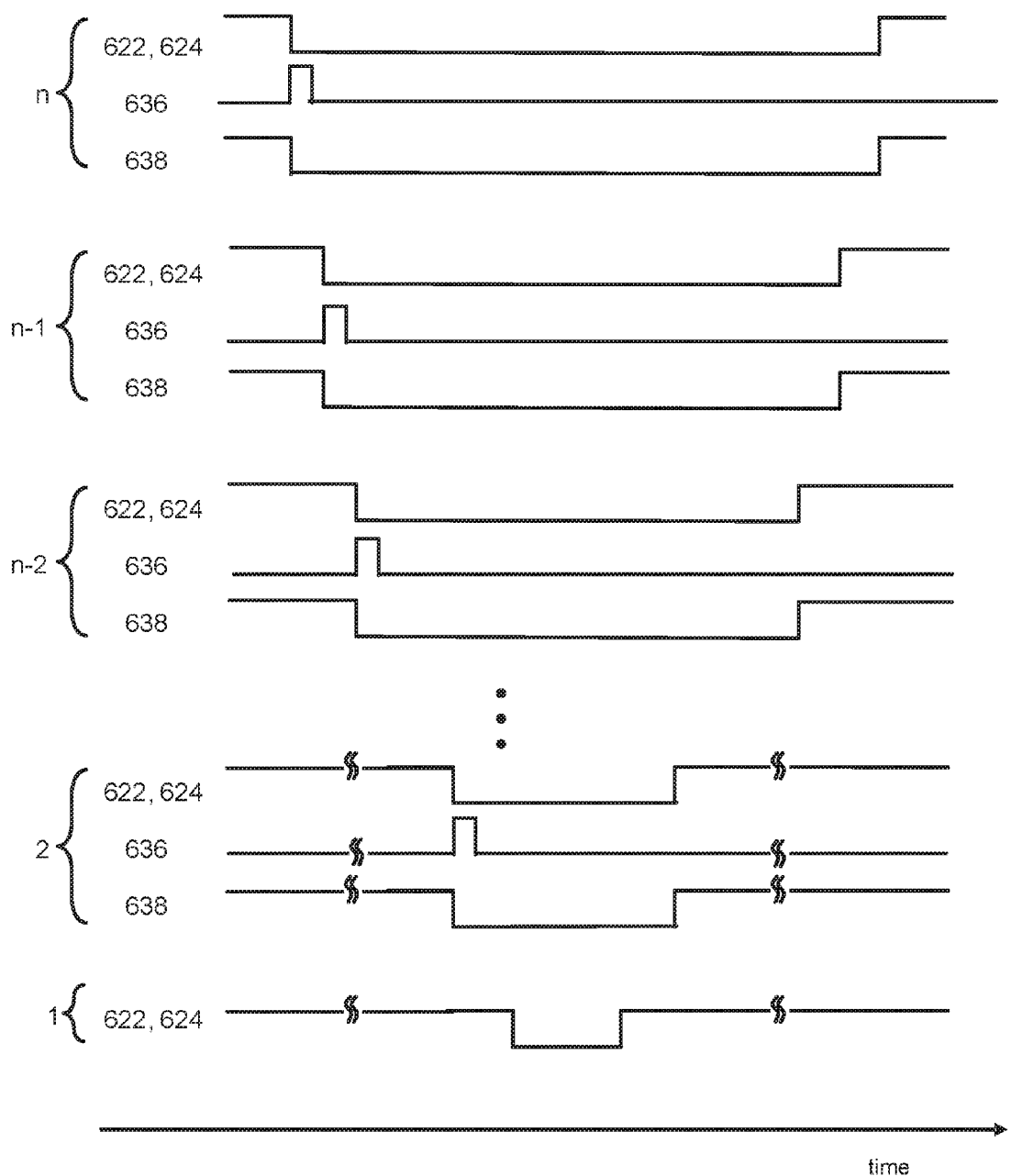

The control signals that are schematically described in FIG. 8B define buildup 623 and fall-off 625 periods of a voltage boost cycle per one cell. In various exemplary embodiments of the disclosure all the cells and inter-cell switching circuits of driver circuit 610 receive control signals as schematically described in FIG. 8B except that there is an overall time shift among different cells. Thus, control signals are firstly transmitted to operate the last cell 612n and inter-cell switching circuit 614n, secondly to operate cell $612_{n-1}$ and inter-cell switching circuit $614_{n-1}$, and so on. A set of control signals suitable for the entire driver circuit according to some embodiments of the present disclosure is illustrated in FIG. 8C. The notations in FIG. 8C are similar to the notations used in FIG. 7C above.

As shown, electronic switches 622, 624 and 638 are reclosed to initiate the fall-off period of the cycle to restore the original voltage. Yet, it is not necessary to transmit another control pulse to electronic switch 636 after the buildup period, since electronic switch 636, as stated, is closed only once, and optionally for a relatively short period of time, during a single voltage boost cycle.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

According to some embodiments there is provided a stylus device for interacting with a computer. The stylus device can comprise an operational circuit, an operational switch for activating and deactivating the operational circuit, and a driving and sensing circuit configured for driving a voltage supply to the operational circuit and sensing a state of the operational switch, wherein the driving and the sensing are executed intermittently on an electrical conductor.

According to some embodiments there is provided a method of communicating with a computer having a touch screen. The method comprises forming a pattern over the touch screen using a stylus device. The stylus device can comprise an operational circuit, an operational switch for activating and deactivating the operational circuit, and a driving and sensing circuit configured for driving a voltage supply to the operational circuit and sensing a state of the operational switch. The driving and the sensing are executed intermittently on an electrical conductor.

According to some embodiments, the driving and sensing circuit is configured for driving a voltage supply to the operational circuit on an electrical conductor, and also for sensing a state of the operational switch on the electrical conductor, wherein the driving and the sensing are executed intermittently.

According to some embodiments, the operational circuit is an eraser circuit.

According to some embodiments, the device comprises a writing tip, and a writing tip driving circuit configured for driving a voltage supply to the writing tip.

According to some embodiments, the operational switch is opposite to the writing tip.

According to some embodiments, the driving and sensing circuit is configured for voltage boosting.

According to some embodiments, the driving and sensing circuit is configured for sensing a voltage on an electrical conductor, and transmitting a signal indicating the state of the operational switch in response to the sensing.

According to some embodiments, the device further comprising a resistive electronic element forming a resistance path from an electrical conductor to a reference point via the operational switch.

According to some embodiments, the driving and sensing circuit is configured for sensing a voltage drop on an electrical conductor when current flows through the resistance path, and transmit a signal indicating that the operational switch is closed in response to the sensing.

According to some embodiments, the device comprises a capacitive electronic element forming a capacitance path from an electrical conductor to a reference point via the operational switch.

According to some embodiments, the driving and sensing circuit is configured for sensing a voltage drop on an electrical conductor when the capacitive electronic element is charged, and transmitting a signal indicating that the operational switch is closed in response to the sensing.

According to some embodiments, the device comprises a controller for transmitting synchronized control signals to the driving and sensing circuit for intermittently executing the driving and sensing, wherein the sensing is executed at a peak of the driving.

According to some embodiments, the device comprises a controller for transmitting synchronized control signals to the driving and sensing circuit for intermittently executing the driving and sensing, wherein the sensing is executed after a peak of the driving.

According to some embodiments, the device comprises a controller for transmitting synchronized control signals to the driving and sensing circuit for intermittently executing the driving and sensing, wherein the sensing is executed before a peak of the driving.

According to some embodiments there is provided a method of operating an electronic circuit which requires a voltage drive, and which is associated with an operational switch for activating and deactivating the electronic circuit. The method comprises driving a voltage supply to the electronic circuit, and sensing a state of the operational switch; wherein the driving and the sensing are executed intermittently on an electrical conductor.

According to some embodiments, the sensing comprises sensing voltage on a resistance path between an electrical conductor and reference point.

According to some embodiments, the sensing comprises sensing voltage on a capacitance path between an electrical conductor and a reference point.

According to some embodiments, the sensing is executed at a peak of the driving.

According to some embodiments, the sensing is executed after a peak of the driving.

According to some embodiments, the sensing is executed before a peak of the driving.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A stylus device for interacting with a computer, the stylus device comprising, an operational circuit, an operational switch for activating and deactivating the operational circuit, a driving and sensing circuit configured for driving a voltage supply to the operational circuit and sensing a state of the operational switch, and a controller for transmitting synchronized control signals to the driving and sensing circuit for intermittently or periodically executing the sensing at a pre-defined time in relation to the driving,
wherein the sensing is executed via a same electrical conductor as the driving.

2. The device of claim 1, wherein the operational circuit is an eraser circuit.

3. The device of claim 1, further comprising a writing tip, and a writing tip driving circuit configured for driving a voltage supply to the writing tip.

4. The device of claim 3, wherein the operational switch is opposite to the writing tip.

5. The device of claim 1, wherein the driving and sensing circuit is configured for sensing a voltage on the electrical conductor, and transmitting a signal indicating the state of the operational switch in response to the sensing.

6. The device of claim 1, further comprising a resistive electronic element forming a resistance path from the electrical conductor to a reference point via the operational switch.

7. The device of claim 6, wherein the driving and sensing circuit is configured for sensing a voltage drop on the electrical conductor when current flows through the resistance path, and transmitting a signal indicating that the operational switch is closed in response to the sensing.

8. The device of claim 1, further comprising a capacitive electronic element forming a capacitance path from the electrical conductor to a reference point via the operational switch.

9. The device of claim 8, wherein the driving and sensing circuit is configured for sensing a voltage drop on the electrical conductor when the capacitive electronic element is charged, and transmitting a signal indicating that the operational switch is closed in response to the sensing.

10. The device of claim 1, wherein the sensing is executed at a peak of the driving.

11. The device of claim 1 wherein the sensing is executed after a peak of the driving.

12. The device of claim 1, wherein the sensing is executed before a peak of the driving.

13. The device of claim 1, wherein said driving comprises boosting.

14. A method of operating an electronic circuit requiring a voltage drive, the electronic circuit being associated with an operational switch for activating and deactivating the electronic circuit, the method comprising:
driving a voltage supply to the electronic circuit via an electrical conductor;
sensing a state of the operational switch via said electrical conductor; and
synchronizing control signals to intermittently or periodically execute the sensing on the same said electrical conductor as the driving at a pre-defined time in relation to the driving.

15. The method of claim 14, wherein the sensing comprises sensing voltage on a resistance path between the electrical conductor and reference point.

16. The method of claim 14, wherein the sensing comprises sensing voltage on a capacitance path between the electrical conductor and a reference point.

17. The method of claim 14, wherein the sensing is executed at a peak of the driving.

18. The method of claim 14, wherein the sensing is executed after a peak of the driving.

19. The method of claim 14, wherein the sensing is executed before a peak of the driving.

20. A method of communicating with a computer having a touch screen, the method comprising forming a pattern over the touch screen using a stylus device, the stylus device having an operational circuit, an operational switch for activating and deactivating the operational circuit, a driving and sensing circuit configured for driving a voltage supply to the operational circuit and sensing a state of the operational switch, and a controller for transmitting synchronized control signals to the driving and sensing circuit for intermittently or periodically executing the sensing at a pre-defined time in relation to the driving, the sensing being executed via a same electrical conductor as the driving.

* * * * *